(12) United States Patent
Frantz et al.

(10) Patent No.: US 11,886,456 B2
(45) Date of Patent: *Jan. 30, 2024

(54) CREATING A MODEL DATA SET USING A SPREADSHEET INTERFACE

(71) Applicant: SIGMA COMPUTING, INC., San Francisco, CA (US)

(72) Inventors: Jason D. Frantz, San Francisco, CA (US); Julie L. Lemieux, San Francisco, CA (US); Robert C. Woollen, San Rafael, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/688,558

(22) Filed: Mar. 7, 2022

(65) Prior Publication Data

US 2022/0188323 A1    Jun. 16, 2022

Related U.S. Application Data

(63) Continuation of application No. 16/924,738, filed on Jul. 9, 2020, now Pat. No. 11,314,762.

(Continued)

(51) Int. Cl.
*G06F 16/00* (2019.01)
*G06F 16/25* (2019.01)
(Continued)

(52) U.S. Cl.
CPC .......... *G06F 16/252* (2019.01); *G06F 16/212* (2019.01); *G06F 16/24573* (2019.01); *G06F 40/18* (2020.01)

(58) Field of Classification Search
CPC ................ G06F 16/252; G06F 16/212; G06F 16/24573; G06F 40/18
See application file for complete search history.

(56) References Cited

U.S. PATENT DOCUMENTS

2004/0237029 A1    11/2004    Medicke et al.
2006/0112123 A1    5/2006    Clark et al.
(Continued)

FOREIGN PATENT DOCUMENTS

CN    102968468 A    3/2013

OTHER PUBLICATIONS

Viswanathan et al., "CAL: A Generic Query and Analysis Language for Data Warehouses," 2011, pp. 1-6. (Year: 2011).*

(Continued)

*Primary Examiner* — Cheryl Lewis (57) ABSTRACT

Creating a model data set using a spreadsheet interface including generating the model data set using the spreadsheet interface and a first data source from a data warehouse, wherein the model data set is a reusable modeling layer comprising at least a portion of the first data source, and wherein generating the model data set comprises: creating a first worksheet using the spreadsheet interface and the first data source; receiving an indication that the first worksheet is a model data set; and generating model data set metadata for the first worksheet; and providing, as a second data source for a second worksheet, the model data set generated from the model data set metadata.

20 Claims, 6 Drawing Sheets

Related U.S. Application Data (60) Provisional application No. 62/912,835, filed on Oct. 9, 2019.

(51) Int. Cl.
    *G06F 16/2457*    (2019.01)
    *G06F 16/21*       (2019.01)
    *G06F 40/18*       (2020.01)

(56) References Cited

U.S. PATENT DOCUMENTS

| | | |
|---|---|---|
| 2007/0061344 A1 | 3/2007 | Dickerman et al. |
| 2014/0244573 A1 | 8/2014 | Gonsalves |
| 2016/0019281 A1 | 1/2016 | Hariharan et al. |
| 2019/0073366 A1 | 3/2019 | Ramaiyer et al. |

OTHER PUBLICATIONS

Bontempo et al., "The IBM Data Warehouse Architecture: How IBM Integrates Its Own and Other Vendors' Tools to Derive Useful Information for Decision Support," pp. 38-48, Sep. 1998, vol. 41, No. 9. (Year: 1998).*
Daniel R. Dolk, "Integrated Model Management in the Data Warehouse Era," European Journal of Operational Research, 2000, pp. 199-218.
International Search Report & Written Opinion PCT/US2020/054817, dated Feb. 8, 2021, 12 pages.
Witkowski et al., "Business Modeling Using SQL Spreadsheets," Proceedings of the 29th VLDB Conference, Berlin, Germany 2003, pp. 1117-1120.

\* cited by examiner

CREATING A MODEL DATA SET USING A SPREADSHEET INTERFACE

CROSS-REFERENCE TO RELATED APPLICATIONS

This application is a continuation application of and claims priority from U.S. patent application Ser. No. 16/924,738, filed Jul. 9, 2020, now U.S. Pat. No. 11,314,762 which is a non-provisional application for patent entitled to a filing date and claiming the benefit of earlier-filed U.S. Provisional Patent Application Ser. No. 62/912,835, filed Oct. 9, 2019, the contents of which are incorporated herein by reference in their entirety.

BACKGROUND

Field of the Invention

The field of the invention is data processing, or, more specifically, methods, apparatus, and products for creating a model data set using a spreadsheet interface.

Description of Related Art

Modern businesses may store large amounts of data in remote databases within cloud-based data warehouses. This data may be accessed using database query languages, such as structured query language (SQL). However, different presentations and configurations of the data may require constructing complex queries, which may be difficult for most users. Further, different users may retrieve and organize data from the database in different ways, leading to multiple different views of the same data.

SUMMARY

Methods, systems, and apparatus for creating a model data set using a spreadsheet interface. Creating a model data set using a spreadsheet interface includes generating the model data set using the spreadsheet interface and a first data source from a data warehouse, wherein the model data set is a reusable modeling layer comprising at least a portion of the first data source, and wherein generating the model data set comprises: creating a first worksheet using the spreadsheet interface and the first data source; receiving an indication that the first worksheet is a model data set; and generating model data set metadata for the first worksheet; and providing, as a second data source for a second worksheet, the model data set generated from the model data set metadata.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
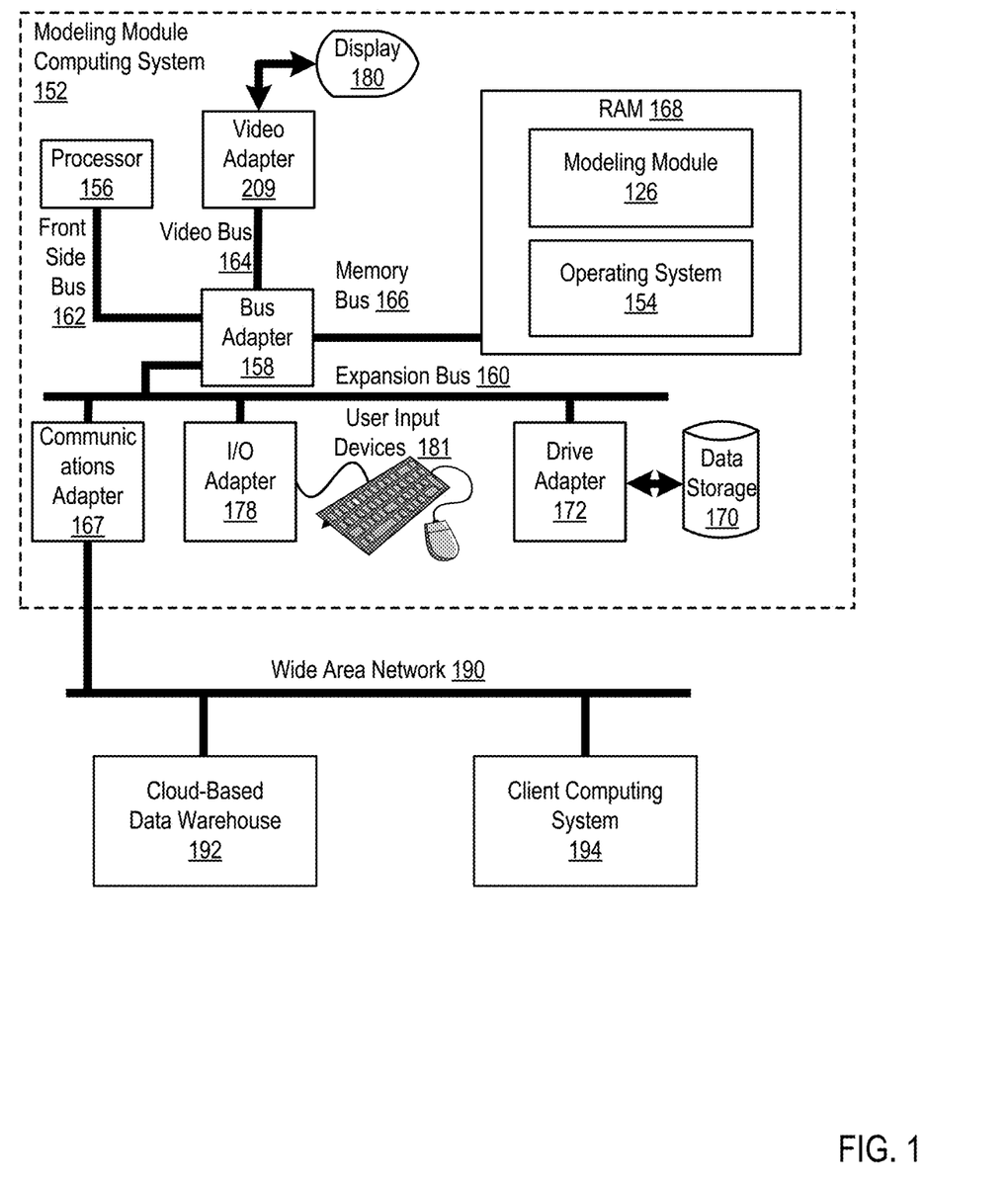
FIG. 1 sets forth a block diagram of an example system configured for creating a model data set using a spreadsheet interface according to embodiments of the present invention.

Exemplary methods, apparatus, and products for creating a model data set using a spreadsheet interface in accordance with the present invention are described with reference to the accompanying drawings, beginning with FIG. 1. FIG. 1 sets forth a block diagram of automated computing machinery comprising an exemplary computing system (152) configured for creating a model data set using a spreadsheet interface according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for creating a model data set using a spreadsheet interface according to embodiments of the present invention include UNIX®, Linux®, Microsoft Windows™, AIX™ and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the modeling module (126), a module for creating a model data set using a spreadsheet interface according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for creating a model data set using a spreadsheet interface according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for creating a model data set using a spreadsheet interface according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the modeling module (126) on the computing system (152).

Figure 2:
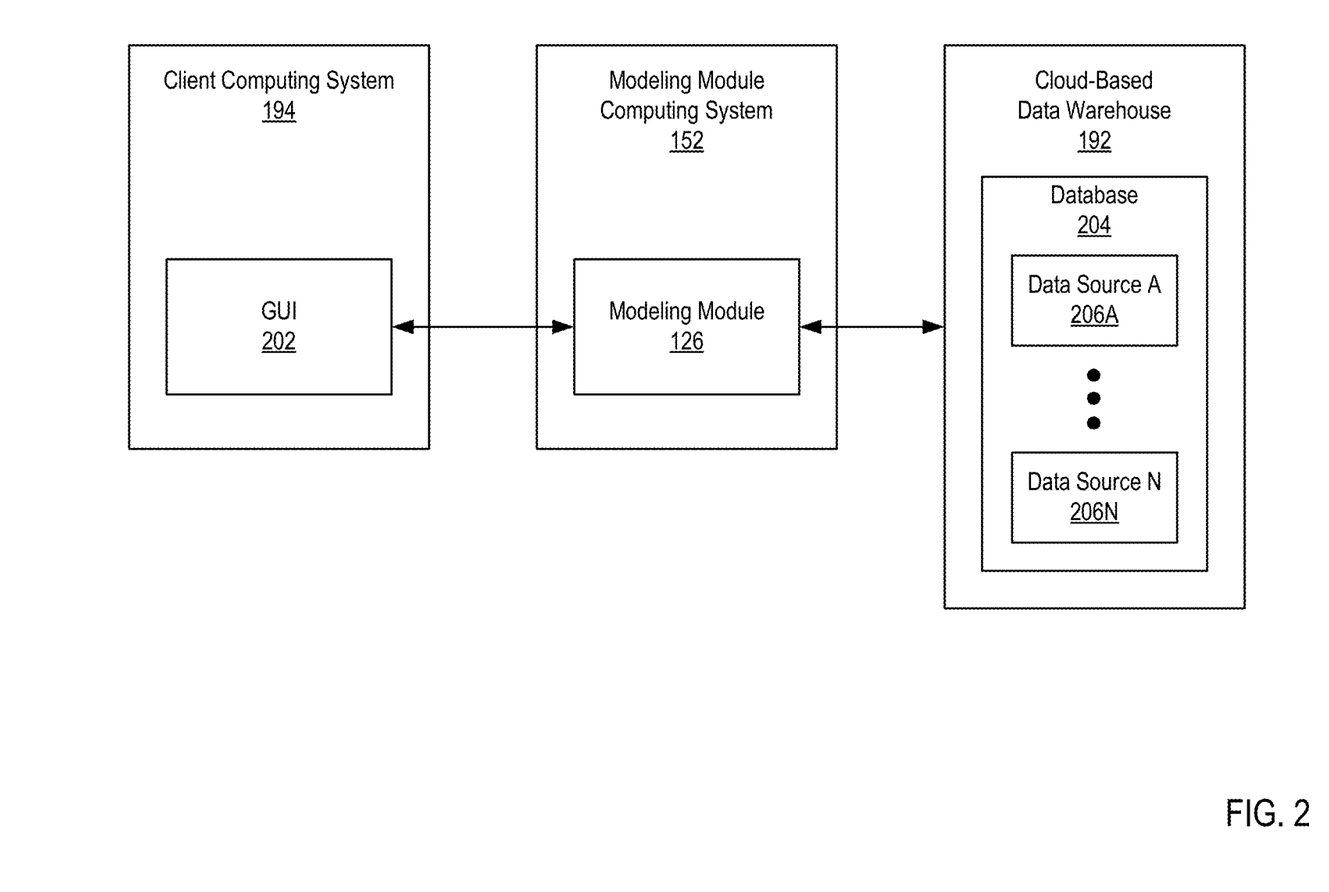
FIG. 2 sets forth a block diagram of an example system configured for creating a model data set using a spreadsheet interface according to embodiments of the present invention.

FIG. 2 shows an exemplary system for creating a model data set using a spreadsheet interface according to embodiments of the present invention. As shown in FIG. 2, the exemplary system includes a client computing system (194), a modeling module computing system (152), and a cloud-based data warehouse (192). The client computing system (194) includes a graphical user interface (GUI). The modeling module computing system (152) includes a modeling module (126). The cloud-based data warehouse (192) includes a database (204). The database (204) includes a number of data sources (data source A (206A), data source N (206N)).

The GUI (202) is a visual presentation configured to present worksheets to a user. A worksheet is a presentation of data from one or more data sources. Such data sources may include data sources (data source A (206A), data source N (206N)) from a database (204) or other worksheets. Each worksheet includes a worksheet architecture and a description of the data. The GUI (202) also receives requests from a user (via a user account) for data from the database (206). The GUI (202) may be presented, in part, by the modeling module (126) and displayed on a client computing system (194) (e.g., on a system display or mobile touchscreen). The GUI (202) may be part of an Internet application that includes the modeling module (126) and is hosted on the modeling module computing system (152).

The database (204) is a collection of data sources (data source A (206A), data source N (206N)) and a management system for the data. A data source (data source A (206A), data source N (206N)) is a collection of related data on the database (204). Examples of data sources include tables, schemas, and folders. Data from the data sources (data source A (206A), data source N (206N)) may be organized into columns and rows. The particular columns, rows, and organization of the columns and rows that make up data may be specified in the database query requesting the data.

The modeling module (126) is hardware, software, or an aggregation of hardware and software configured to receive requests from the client computing system (194), via the GUI (GUI). The modeling module (126) is also configured to generate database queries in response to requests for data and manipulations of that data via the spreadsheet interface in the GUI (202). The modeling module (126) may be part of a database query generator that generates the database query.

The modeling module (126) presents, via the spreadsheet interface in the GUI (202), a worksheet using the information in the worksheet metadata. Worksheet metadata is data that describes a worksheet. Specifically, the worksheet metadata may include a description of the data sources and a worksheet architecture. The description of the data sources describes which data is to be requested via the database query or retrieved from another worksheet. The description of the data set may include which columns and rows of data from the data source are to be retrieved from the database (206) via the database query. The data presented in the worksheet may be referred to as the underlying data (i.e., the data upon which the worksheet is created).

The worksheet architecture includes the functions to be applied to the data and the presentation structure of the data. The functions to be applied to the data may include the manipulations of the data in the columns and rows received in the data. Such manipulations may include calculation columns that apply a function to data in the data. The presentation structure of the data may include presentation selections made by a user. The presentation structure may include the hierarchical relationship between the columns, filters applied to the data, and the manner in which the data is sorted. The presentation structure of the data may also include the GUI visibility of a particular subset of the data. GUI visibility may be altered based on filter settings of the data or on the visibility status (e.g., hidden or not hidden) of a column within the data. The presentation structure of the data may also include the formatting of the worksheet, such as the size of rows and columns.

Worksheet metadata may also include a reference to, or identifier of, the worksheet metadata for a different worksheet. For example, the worksheet metadata for a referencing worksheet may include a reference to the data source worksheet from which the referencing worksheet was linked. Further, referencing worksheet metadata may lack a reference to the database or data upon which the data source worksheet was built. Rather, the referencing worksheet metadata may only include a reference to the data source worksheet metadata, and that reference is used to retrieve the data source worksheet metadata. Because the referencing worksheet metadata may lack a reference to the database or data, both the referencing worksheet metadata and data source worksheet metadata are used to generate the database query.

A model data set may be generated as a particular type of worksheet. A model data set is collection, composition, and organization of data that provides a single source of truth for that data. Further, the model data set is a reusable modeling layer that may be used as an input data source for other worksheets. The model data set may also be referred to as a semantic modeling layer. As with worksheet metadata, modeling data set metadata is data that describes a model data set. Also, as with worksheet metadata, the model data set metadata includes a description of the data sources and a worksheet architecture.

As an example, consider a regional branch of a sales business that wants to provide a model data set describing the sales accounts for all salespeople to use. The head of the sales department may generate the model data set that includes a contact person for each client, contact details for the contact person, and aggregated sales information based on total sales in the business's region. This model data set may use, as input data sources, different tables from a database on a cloud-based data warehouse. Specifically, the model data set may use as accounts contact table and a sales table as data sources. The head of sales generates the model data set using the spreadsheet interface of the GUI (202). The head of sales also includes a calculation column that displays an aggregated sales total for each client over the last 12 months.

Continuing with the example, each salesperson is provided an identifier of the model data set. Using their own accounts, each salesperson creates a new worksheet using the model data set as a data source. The new worksheet allows each salesperson to perform their own analysis on the model data set. The model data set is provided to each salesperson in a view mode that prevents destructive edits to the model data set and allows additive edits to the model data set within the new worksheet.

Continuing with the example, assume that one salesperson is tasked with contacting the top five clients based on the aggregated sales total for the last 12 months, and another salesperson is tasked with the bottom five clients based on the aggregated sales total for the last 12 months. Because both salespeople are using the same model data set that calculates and presents the aggregated sales data in the same manner, both can be assured that their sources of information (the aggregated sales data) are the same. Subsequently each salesperson may perform their individual analysis on the model data set within their own worksheets.

Figure 3:
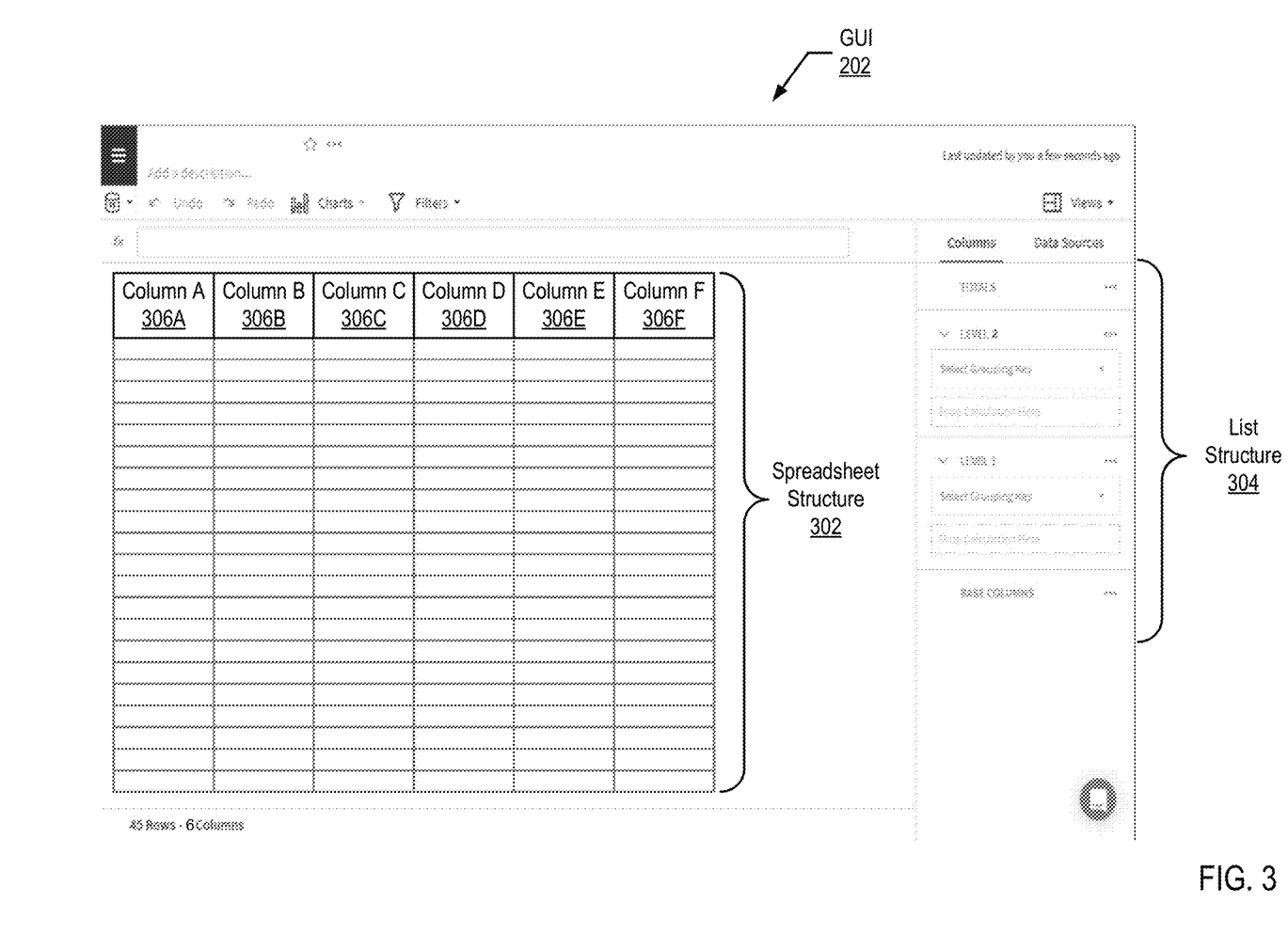
FIG. 3 sets forth a block diagram of an example graphical user interface configured for creating a model data set using a spreadsheet interface according to embodiments of the present invention.

FIG. 3 shows an exemplary system for creating a model data set using a spreadsheet interface according to embodiments of the present invention. As shown in FIG. 3, the exemplary GUI (202) includes a spreadsheet structure (302), a list structure (304), and an exposable parameter (306). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request data from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate request (e.g., in the form of a state specification) for data and send the request to the data analyzer (126). Such a mechanism may also include a direct identification of the rows and columns of a database data set that a user would like to access (e.g., via a selection of the rows and columns in a dialog box).

The spreadsheet structure (302) along with the other elements of the GUI (202) make up a spreadsheet interface. The spreadsheet interface receives input from a user and generates a worksheet. The generated worksheet may be a model data set.

Figure 4:
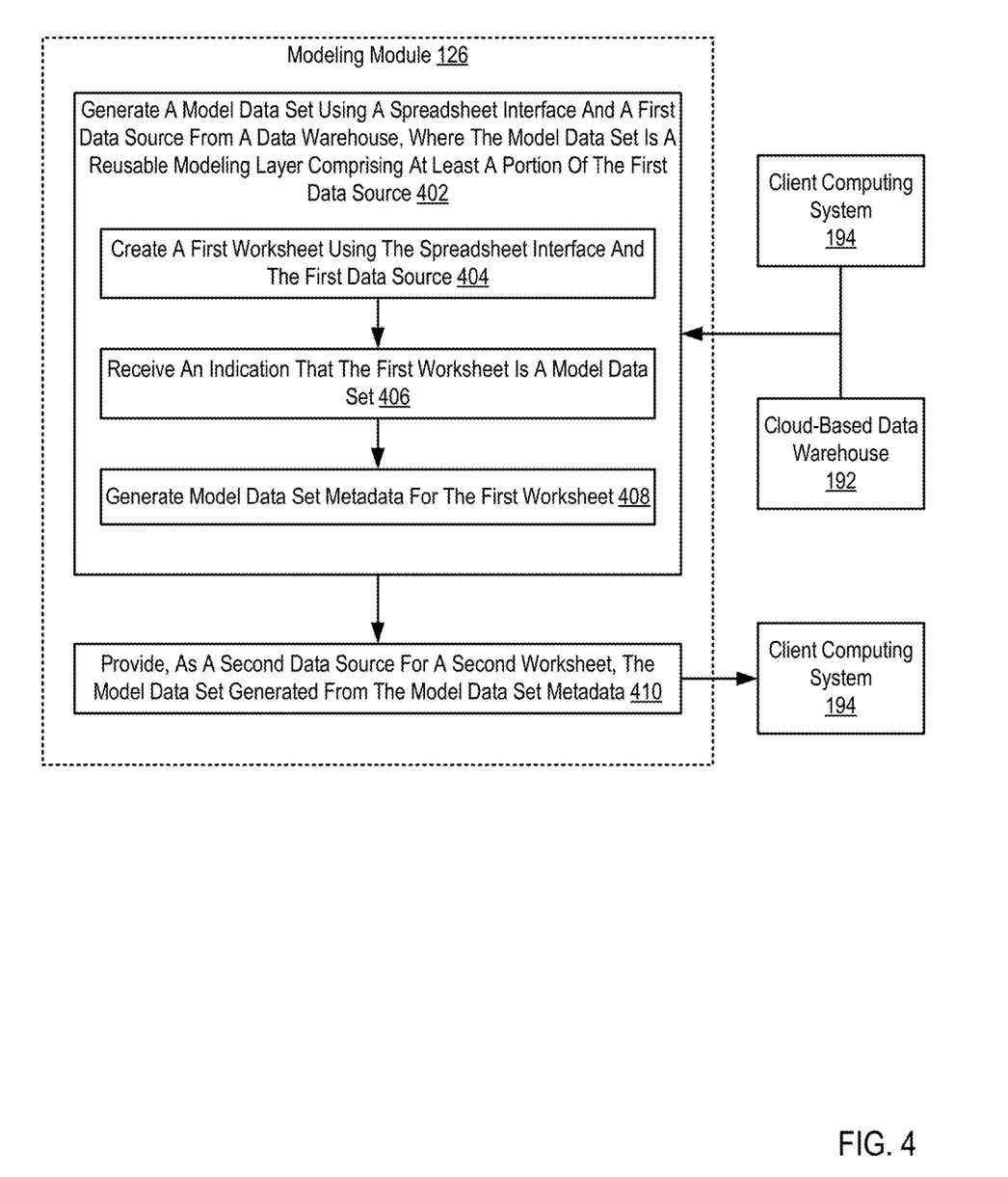
FIG. 4 sets forth a flow chart illustrating an exemplary method for creating a model data set using a spreadsheet interface according to embodiments of the present invention.

For further explanation, FIG. 4 sets forth a flow chart illustrating an exemplary method for creating a model data set using a spreadsheet interface according to embodiments of the present invention that includes generating (402) a model data set using a spreadsheet interface and a first data source from a data warehouse (192), wherein the model data set is a reusable modeling layer comprising at least a portion of the first data source. Generating (402) a model data set using a spreadsheet interface and a first data source from a data warehouse (192) may be carried out by the modeling module (126) creating (404) a first worksheet using the spreadsheet interface and the first data source; receiving (406) an indication that the first worksheet is a model data set; and generating (408) model data set metadata for the first worksheet. Generating (402) a model data set using a spreadsheet interface may be carried out without receiving code (e.g., SQL statements, etc.) as input from a user creating the model data set.

The model data set is a reusable modeling layer that includes at least a portion of the first data source. Specifically, the model data set may be utilized by other worksheets as a data source without altering the model data set. Further, the model data set may be used by any number of worksheets as a data source so that each worksheet is assured to be using the same data from within the model data set. The model data set may include both data from a database and functions applied to that data. For example, the model data set may include a column that presents results of a function applied to data from the first data source on the database.

Generating (402) the model data set includes creating (404) a first worksheet using the spreadsheet interface and the first data source. Creating (404) a first worksheet using the spreadsheet interface and the first data source may be carried out by the modeling module (126) receiving, via a GUI interface on the client computing system (194), a configuration of the spreadsheet interface that includes a description of the data from one or more data sources, including the first data source. Additional data sources may be worksheets or from the data warehouse (192). The configuration of the spreadsheet interface may also include a worksheet architecture to be applied to the portion of the first data source and any additional data sources.

Generating (402) the model data set further includes receiving (406) an indication that the first worksheet is a model data set. Receiving (406) an indication that the first worksheet is a model data set may be carried out by the modeling module (126) detecting, via the spreadsheet interface, that the first worksheet is being prepared as a model data set. The indication may be received at any point during the generation of the model data set, including before other information about the model data set is received (e.g., a description of the data sources or worksheet architecture). The indication may be a selection made by a user via a menu in the spreadsheet interface.

Generating (402) the model data set further includes generating (408) model data set metadata for the first worksheet. Generating (408) model data set metadata for the first worksheet may be carried out by the modeling module (126) converting the received interactions with the spreadsheet interface into metadata for the model data set. Generating (408) model data set metadata for the first worksheet may be performed continuously as changes are made to the first worksheet. The model data set metadata may include a standard query language (SQL) statement. Specifically, the description of the data from the first data source may include one or more SQL statements targeting the database on the data warehouse (192).

The method of FIG. 4 further includes providing (410), as a second data source for a second worksheet, the model data set generated from the model data set metadata. Providing (410), as a second data source for a second worksheet, the model data set generated from the model data set metadata may be carried out by the modeling module (126) receiving, from a user via the spreadsheet interface, a request to create a worksheet using the model data set as a data source. In response, the modeling module (126) generates the second worksheet that includes the model data set. The second worksheet presented to the user may be identical to the model data set but include the ability to make additive edits to the model data set.

The second worksheet may be configured to perform analysis on the portion of the first data source within the model data set without changing the model data set. Specifically, the second worksheet may include, or have added, elements that use data in the model data set as inputs for analysis on that data. The second worksheet may also include other data sources to combine with the model data set. These additional data sources may include an additional model data set.

The above limitations improve the operation of the computer system by providing a collection, composition, and organization of data that is a single source of truth for that data. Specifically, the above limitations allow for the creation of a model data set using a spreadsheet interface without receiving code as input. The model data set may then be used by multiple other worksheets with an assurance that each is utilizing identical data in the model data set.

Figure 5:
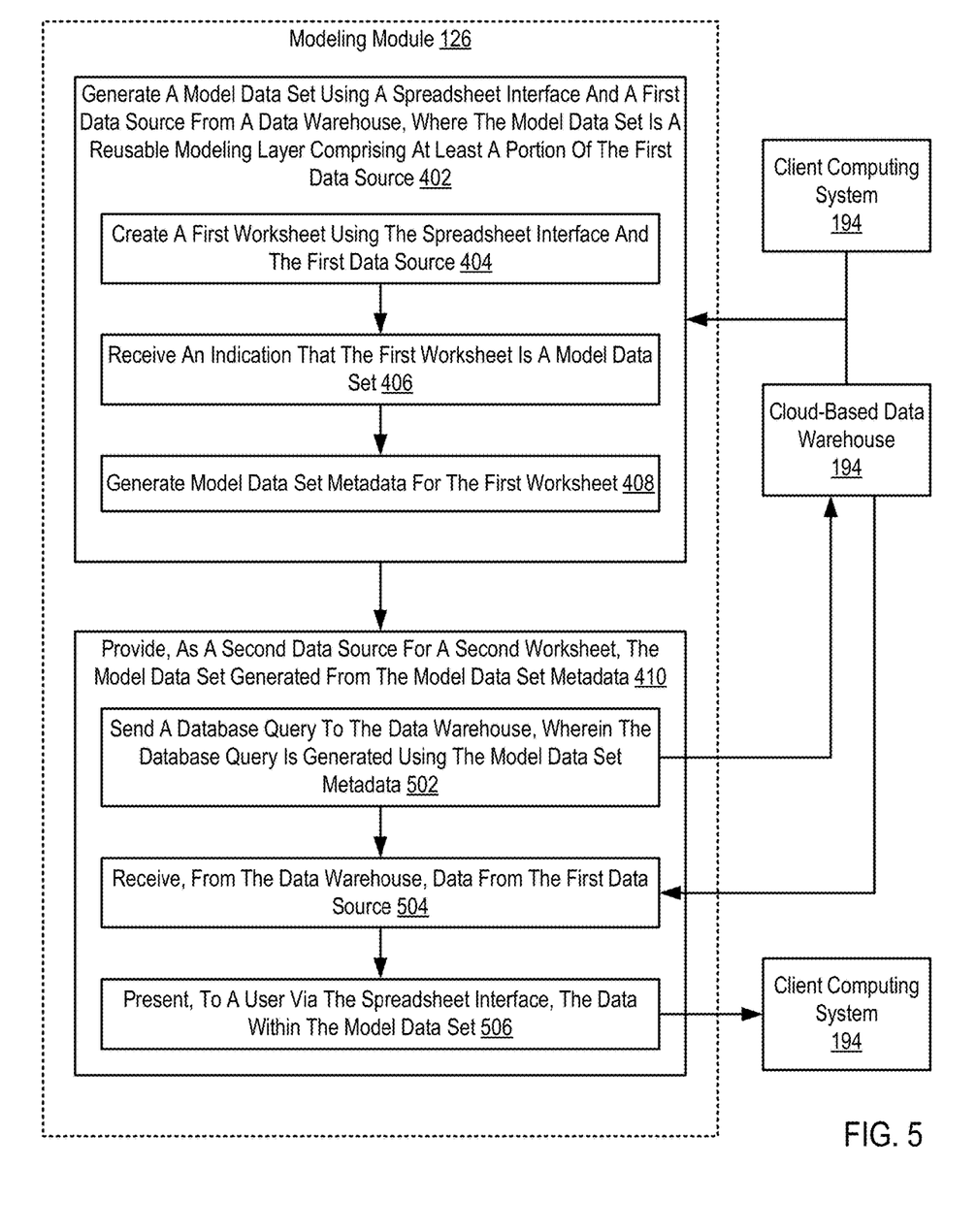
FIG. 5 sets forth a flow chart illustrating an exemplary method for creating a model data set using a spreadsheet interface according to embodiments of the present invention.

For further explanation, FIG. 5 sets forth a flow chart illustrating a further exemplary method for creating a model data set using a spreadsheet interface according to embodiments of the present invention that includes generating (402) a model data set using a spreadsheet interface and a first data source from a data warehouse (192), wherein the model data set is a reusable modeling layer comprising at least a portion of the first data source, and wherein generating the model data set comprises: creating (404) a first worksheet using the spreadsheet interface and the first data source; receiving (406) an indication that the first worksheet is a model data set; and generating (408) model data set metadata for the first worksheet; and providing (410), as a second data source for a second worksheet, the model data set generated from the model data set metadata.

The method of FIG. 5 differs from the method of FIG. 4, however, in that providing (410), as a second data source for a second worksheet, the model data set generated from the model data set metadata includes sending (502) a database query to the data warehouse (192), wherein the database query is generated using the model data set metadata; receiving (504), from the data warehouse (192), data from the first data source; and presenting (506), to a user via the spreadsheet interface, the data within the model data set.

In order to present the second worksheet to a user via the spreadsheet interface, any data from the data warehouse (192) must be retrieved. Sending (502) a database query to the data warehouse (192), wherein the database query is generated using the model data set metadata may be carried out by the modeling module (126) accessing the model data set metadata and generating the database query using database query statements in the model data set metadata or converting elements in the model data set metadata into database query statements. The database query may be an SQL query.

Receiving (504), from the data warehouse (192), data from the first data source may be carried out by the modeling module (126) receiving a response to the database query in the form of data from the data warehouse (192). Presenting (506), to a user via the spreadsheet interface, the data within the model data set may be carried out by the modeling module (126) combining the response to the database query with other information in the model data set metadata to generate the second worksheet. The same steps may be carried out when presenting the model data set to the user during the initial creation of the model data set.

Figure 6:
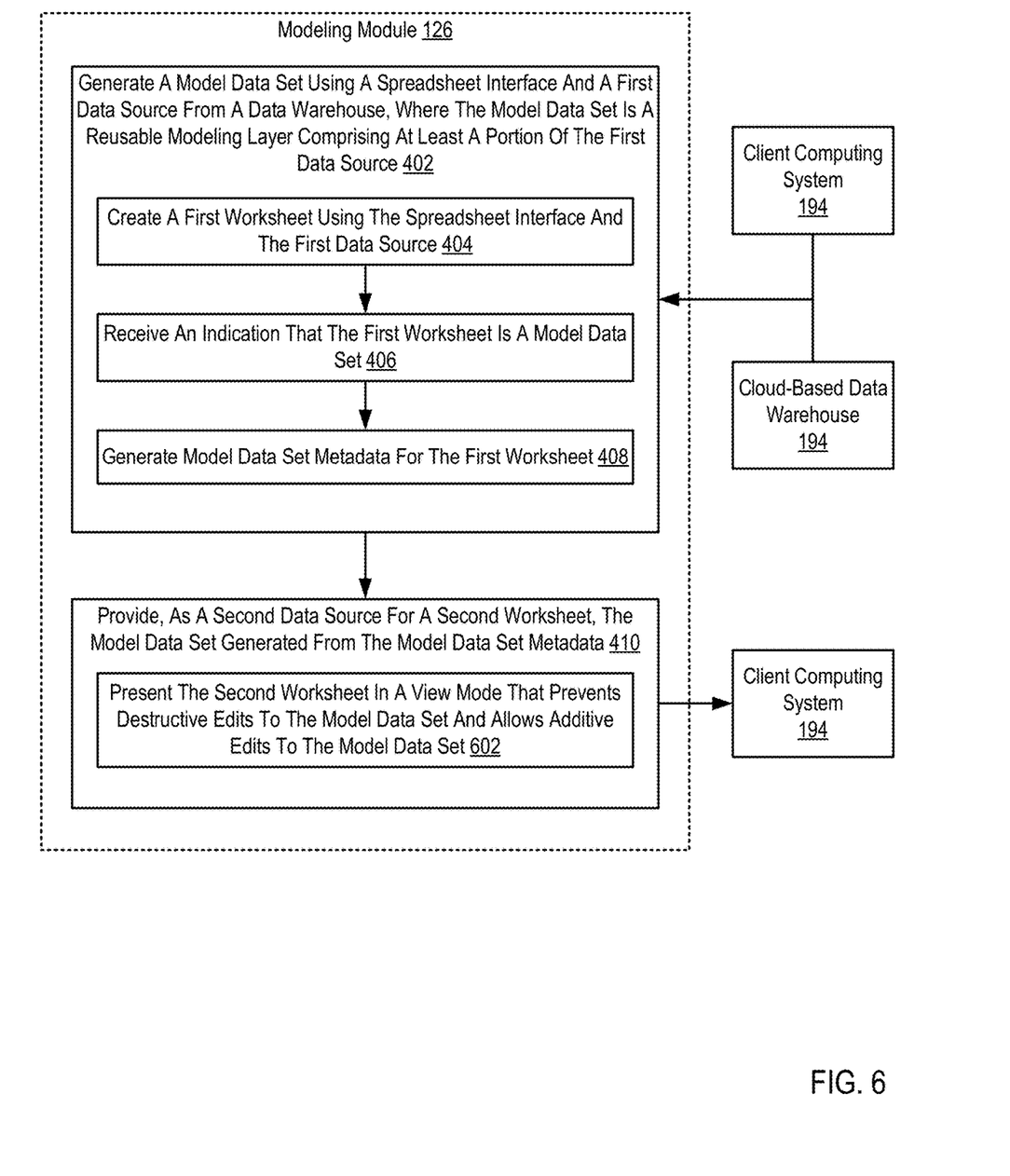
FIG. 6 sets forth a flow chart illustrating an exemplary method for creating a model data set using a spreadsheet interface according to embodiments of the present invention.

For further explanation, FIG. 6 sets forth a flow chart illustrating a further exemplary method for creating a model data set using a spreadsheet interface according to embodiments of the present invention that includes generating (402) a model data set using a spreadsheet interface and a first data source from a data warehouse (192), wherein the model data set is a reusable modeling layer comprising at least a portion of the first data source, and wherein generating the model data set comprises: creating (404) a first worksheet using the spreadsheet interface and the first data source; receiving (406) an indication that the first worksheet is a model data set; and generating (408) model data set metadata for the first worksheet; and providing (410), as a second data source for a second worksheet, the model data set generated from the model data set metadata.

The method of FIG. 6 differs from the method of FIG. 4, however, in that providing (410), as a second data source for a second worksheet, the model data set generated from the model data set metadata includes presenting (602) the second worksheet in a view mode that prevents destructive edits to the model data set and allows additive edits to the model data set. The portion of the second worksheet presenting the model data set may be a "read-only" portion of the second worksheet. Attempts to make changes to that portion of the second worksheet may be denied. However, attempts to made additions or changes to the other portions of the second worksheet not presenting a model data set may be allowed. Each user requesting a worksheet with the model data set as a data source may also be prevented from making changes to the model data set.

In view of the explanations set forth above, readers will recognize that the benefits of creating a model data set using a spreadsheet interface according to embodiments of the present invention include:

Improving the operation of a computing system by providing a collection, composition, and organization of data that is a single source of truth for that data, increasing computing system efficiency and usability.

Improving the operation of a computing system by allowing for the creation of a model data set using a spreadsheet interface without receiving code as input, increasing computing system efficiency and usability.

Exemplary embodiments of the present invention are described largely in the context of a fully functional computer system for creating a model data set using a spreadsheet interface. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of creating a model data set using a spreadsheet interface, the method comprising:
   creating a first worksheet using the spreadsheet interface and a first data source;
   receiving an indication that the first worksheet is a model data set;
   generating model data set metadata for the first worksheet; and
   providing, as a second data source for a second worksheet, the model data set generated from the model data set metadata.

2. The method of claim 1, wherein the second worksheet is configured to perform analysis on a portion of the first data source within the model data set without changing the model data set.

3. The method of claim 1, wherein providing the model data set generated from the model data set metadata comprises:
   sending a database query to a data warehouse, wherein the database query is generated using the model data set metadata;
   receiving, from the data warehouse, data from the first data source; and
   presenting, to a user via the spreadsheet interface, the data within the model data set.

4. The method of claim 1, wherein providing the model data set generated from the model data set metadata comprises presenting the second worksheet in a view mode that prevents destructive edits to the model data set and allows additive edits to the model data set.

5. The method of claim 1, wherein the second worksheet includes a third data source comprising an additional model data set.

6. The method of claim 1, wherein the model data set includes a column that presents results of a function applied to data from the first data source.

7. The method of claim 1, wherein the model data set metadata comprises a standard query language statement.

8. An apparatus for creating a model data set using a spreadsheet interface, the apparatus comprising a computer processor, a computer memory operatively coupled to the computer processor, the computer memory having disposed within it computer program instructions that, when executed by the computer processor, cause the apparatus to carry out the steps of:
   creating a first worksheet using the spreadsheet interface and a first data source;
   receiving an indication that the first worksheet is a model data set;
   generating model data set metadata for the first worksheet; and
   providing, as a second data source for a second worksheet, the model data set generated from the model data set metadata.

9. The apparatus of claim 8, wherein the second worksheet is configured to perform analysis on a portion of the first data source within the model data set without changing the model data set.

10. The apparatus of claim 8, wherein providing the model data set generated from the model data set metadata comprises:
    sending a database query to a data warehouse, wherein the database query is generated using the model data set metadata;
    receiving, from the data warehouse, data from the first data source; and
    presenting, to a user via the spreadsheet interface, the data within the model data set.

11. The apparatus of claim 8, wherein providing the model data set generated from the model data set metadata comprises presenting the second worksheet in a view mode that prevents destructive edits to the model data set and allows additive edits to the model data set.

12. The apparatus of claim 8, wherein the second worksheet includes a third data source comprising an additional model data set.

13. The apparatus of claim 8, wherein the model data set includes a column that presents results of a function applied to data from the first data source.

14. The apparatus of claim 8, wherein the model data set metadata comprises a standard query language statement.

15. A computer program product for creating a model data set using a spreadsheet interface, the computer program product disposed upon a computer readable medium, the computer program product comprising computer program instructions that, when executed, cause a computer to carry out the steps of:
  creating a first worksheet using the spreadsheet interface and a first data source;
  receiving an indication that the first worksheet is a model data set;
  generating model data set metadata for the first worksheet; and
  providing, as a second data source for a second worksheet, the model data set generated from the model data set metadata.

16. The computer program product of claim 15, wherein the second worksheet is configured to perform analysis on a portion of the first data source within the model data set without changing the model data set.

17. The computer program product of claim 15, wherein providing the model data set generated from the model data set metadata comprises:
  sending a database query to a data warehouse, wherein the database query is generated using the model data set metadata;
  receiving, from the data warehouse, data from the first data source; and
  presenting, to a user via the spreadsheet interface, the data within the model data set.

18. The computer program product of claim 15, wherein providing the model data set generated from the model data set metadata comprises presenting the second worksheet in a view mode that prevents destructive edits to the model data set and allows additive edits to the model data set.

19. The computer program product of claim 15, wherein the second worksheet includes a third data source comprising an additional model data set.

20. The computer program product of claim 15, wherein the model data set includes a column that presents results of a function applied to data from the first data source.

* * * * *